Patented Mar. 14, 1944

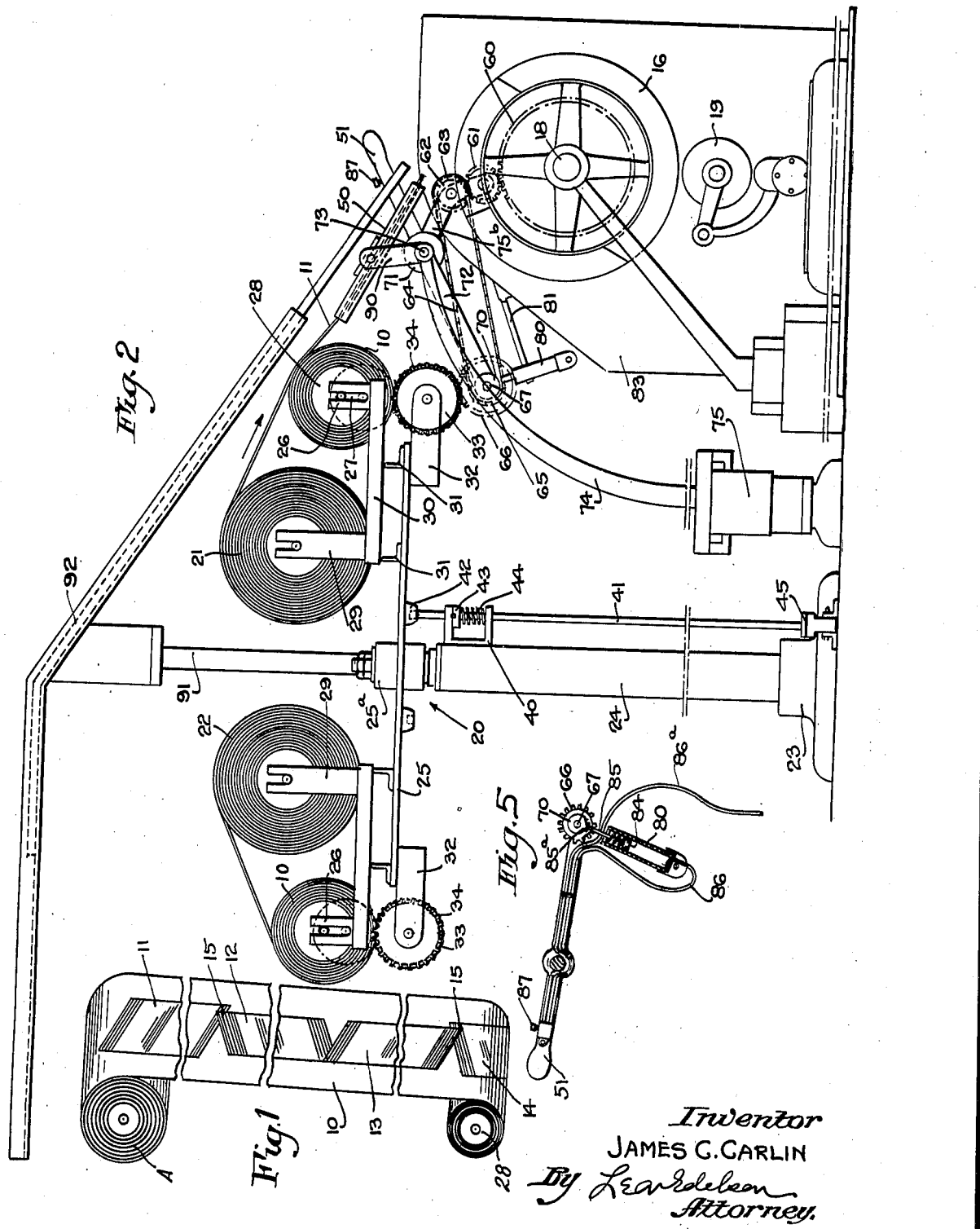

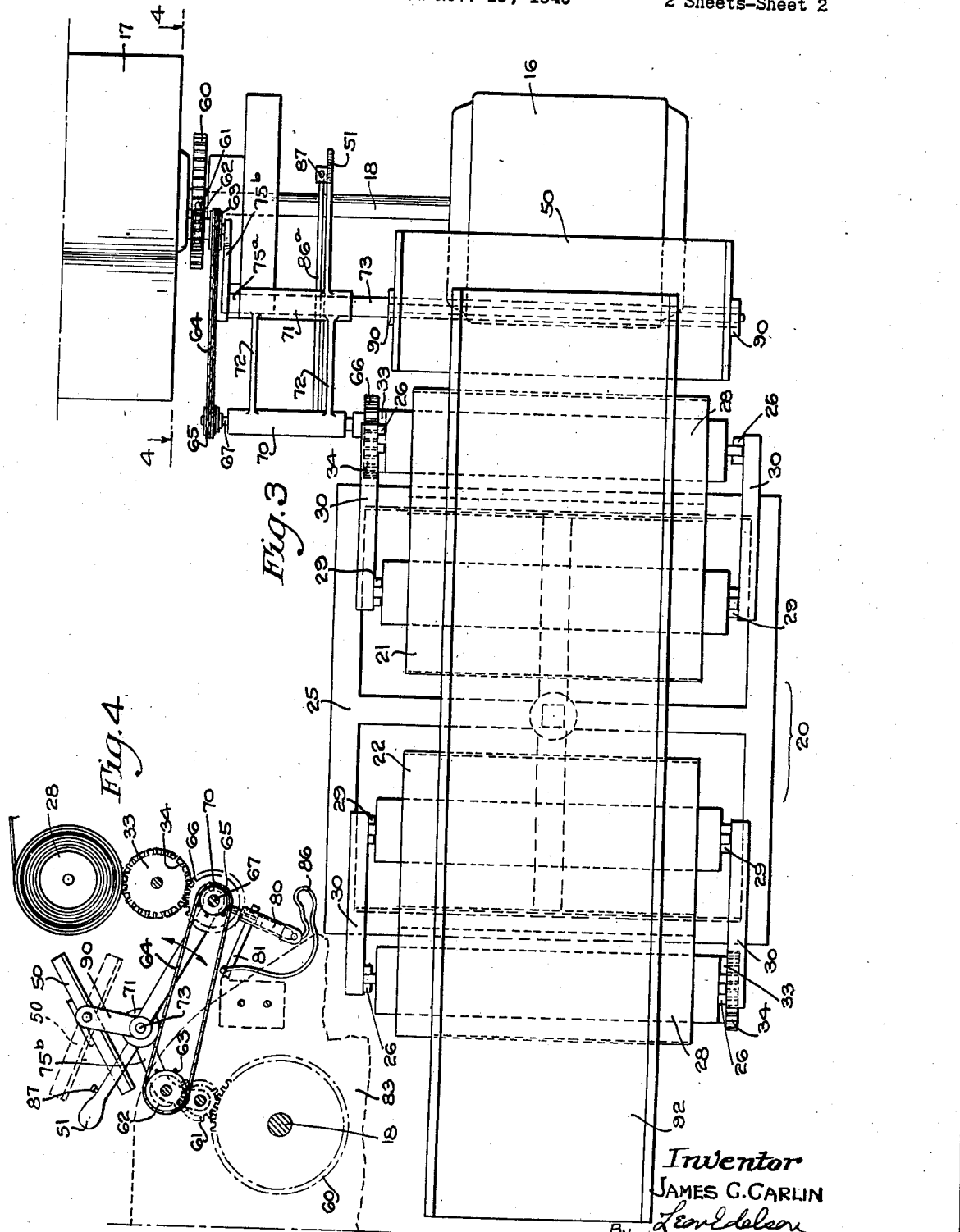

2,343,954

UNITED STATES PATENT OFFICE 2,343,954

FEEDING MECHANISM FOR TIRE BUILDING

James C. Carlin, Norristown, Pa., assignor to Lee Rubber & Tire Corporation, Conshohocken, Pa., a corporation of New York Application November 19, 1940, Serial No. 366,215

9 Claims. (Cl. 154—10)

The present invention relates to a tire building apparatus and is more particularly directed to an apparatus designed for automatic feeding of tire fabric strips to the tire building drum.

In other applications filed on even date herewith, Serial Nos. 366,214 and 366,216, I have described a process and apparatus for feeding and assembling tire fabric strips together with a carrier web therefor into roll form so that the strips thereof are arranged in groups, each group containing the requisite number of strips for a tire, the strips therein also being properly dimensioned and arranged for feeding to the tire building drum.

The present invention contemplates an apparatus which provides for the automatic feeding of the strips to the tire building drum.

Another object of the present invention is to provide means for the control of the feeding apparatus in such a manner that the operator may start and stop the feeding at any desired point so as to permit the stitching rolls to operate upon the strip or strips which are being fed to the tire drum.

Another object of the invention is to provide an apparatus of the type described which minimizes the interruption occasioned by the exhaustion of one roll of strips.

Other objects of the present invention will become apparent to persons skilled in the art from the following specification and the accompanying drawings.

In the drawings:

Figure 1 is a diagrammatic illustration of a portion of the carrier web and a group of tire strips carried by the web;

Figure 2 is an elevational view of the apparatus embodying the present invention;

Figure 3 is a plan view thereof;

Figure 4 is a detail view of the power transmission employed in the present invention; and Figure 5 is a detail view of the pneumatic control of the power transmission.

The apparatus to which the present application is particularly directed is designed for the automatic feeding of tire fabric strips to the tire building drum, thereby substantially eliminating any manual handling of the strips at this point in the manufacture of tires. In prior practice a great deal of time and labor was consumed at this point in the manipulation of the strips as they were being fed to the tire building drum. By means of the present invention, a single operator controls the operation of the present feeding apparatus and of the tire building drum with great facility and the operations are accomplished with greater speed and accuracy and with an enhancement of the quality of the tire.

Figure 1 is a diagrammatic showing of the arrangement of the tire strips or strips of tire fabric on the carrier web, the latter being arranged in roll form with the tire fabric strips disposed thereon in such manner as to be wrapped between the convolutions of the roll of carrier web, the unit so prepared being designated in Figure 1 by the reference character A. This unit is preferably prepared and assembled as described in the applications aforesaid Serial Nos. 366,214 and 366,216.

The carrier web 10 carries substantially throughout its length a multiplicity of tire fabric strips which are arranged successively on the web as shown in Figure 1. This figure shows strips 11, 12, 13 and 14 which are of different lengths and of three widths, strips 12 and 13 being of the same width. This showing is based on the assumption that a tire is being built from four ply tire fabric and will employ for its first strip, strip 11 of one width and for its second and third strips it will employ strips 12 and 13 of another width and for its fourth strip it will employ strip 14 of still another width. The lengths of the strips also vary; the first strip to go on the tire building drum being the shortest and the others each increasing in length in order to compensate for the increased circumference of the tire building surface as the strips are applied successively. The strips are disposed on the web 10 in such a manner that the adjacent ends of adjacent strips are disposed angularly with relation to each other. By this arrangement the strips as they are fed to the tire building drum are each applied in such a way that the ends of each strip overlap each other, the overlap or line joining such ends in one strip crosses the joint of the adjacent strip. It should also be noted as shown at 15 that the adjacent corners of adjacent strips overlap. This overlapping assists in the feeding of such strips in that it has the effect of converting such strips into a more or less continuous web so that each strip draws the strip behind it in the feeding operation. At the same time the operator can easily detach one strip from the strip behind it and stop the feeding operation and perform any desired operation upon the strip that is already on the tire building drum, such as applying the stitching rolls or the like.

Referring now more particularly to the apparatus employed in the exercise of the present invention, 16 represents a collapsible tire building drum commonly employed in the tire building art which is driven by the motor 17 through shaft 18. 19 represents the stitching roll or a pair of such stitching rolls which operate upon tire strips on the drum 16 so as to compact the successive strips into an integral structure. The structure indicated generally by the reference character 20 is designed for the support of two rolls 21 and 22 of strips of tire fabric and a carrier web therefor. As shown in Figure 2, the strips on roll 21 are being fed to the tire building drum 16 while roll 22 is idle and is available for the feeding operation immediately upon the exhaustion of roll 21.

The apparatus for supporting and feeding these rolls comprises a base 23, a standard 24 and a framework 25 carried by a rotatable sleeve 25a. The framework 25 carries at one end thereof a pair of brackets 26 each provided with an elongated slot 27 to receive a take-up roll 28. The frame 25 also carries closely behind the pair of brackets 26 another pair of brackets 29 for the support of a loaded or filled roll 21. These brackets 26 and 29 may be supported upon the frame 25 in any desirable manner and as shown are supported by means of bars 30 and cross bars 31. The frame 25 also carries at the end thereof and below the brackets 26 a pair of brackets 32 which support a canvas covered driving roll 33 carrying a driving pinion 34 at one end.

The structure described and which includes elements 26 to 34 inclusive is duplicated at the other end of the frame 25 for the support of an idle loaded roll 22 and a take-up roll for the same so that when the roll 21 is exhausted, the driving means which transmit power to pinion 34 and roll 33 are detached therefrom, the frame 25 is rotated so that the roll 22 and its associated take-up roll and drive roll assume the operative position and become available for feeding strips to the tire building drum. The roll 28 now loaded with carrier fabric without any tire strips is removed, a new loaded roll is now placed on the brackets 29 and the apparatus is prepared with a spare roll of tire strips for subsequent use.

The standard 24 carries a bracket 40 and rod 41 passes through openings in the legs of the bracket 40 for engagement with the recessed boss 42 carried on the under face of the frame 25. The rod 41 is provided with a fixed collar 43 and a helical spring 44 is disposed between the lower arm of the bracket 40 and the fixed collar 43. At its lower end the rod 41 is attached to the pedal 45. The upper end of the rod 41 is normally in engagement with the recessed boss 42 so as to lock the frame 25 in operative position. When it is desired to rotate the frame 25 so as to bring the spare roll of tire strips into operative position, the operator steps on pedal 45, thereby depressing rod 41 against the action of the spring 44, releases the rod from the boss 42, rotates the frame 25 and then releases the pedal 45 and permitting the rod 41 to come into engagement with the duplicate boss 42 on the other side of the frame.

In operation the take-up roll 28 merely takes up the carrier web 10 from the roll 21 while the tire fabric strips carried thereby are separated from the carrier fabric and are caused to travel on the guide plate 50, the strips travelling from the plate 50 onto the face of the rotating drum 16. The operator stands in front of the drum 16 and guides each strip properly onto the drum 16. The feeding of the strips is always under the operator's control by means of the handle bar 51. In normal operation the operator permits the feeding of one strip at a time and when a strip has been fully fed he stops rotation of the take-up roll 28 and starts the operation of the stitching rolls 19.

The canvas covered roll 33 is in contact with the outer face of the take-up roll 28 and constitutes a frictional drive for the take-up roll 28. In the transmission of power from the motor 17 to the roll 33 and the take-up roll 28, the gearing system is so arranged that the linear speed of the face of the roll 33 is the same as the linear speed of the face of the tire building drum 16, thereby providing a rate of feed of the strips which is the same as the linear speed of the cylindrical face of the tire building drum 16.

The power is transmitted from the motor 17 to the pinion 34 on the drive roll 33 by means of gears 60, 61 and 62 which drive the sprocket wheel 63. Sprocket chain 64 transmits power to sprocket wheel 65, which in turn drives gear 66 through stub shaft 67. The gear 66 meshes with gear 34 on the friction roll 33.

The present apparatus also provides devices for interrupting the feed of the strip rolls while the drum 16 continues its rotation to subject the tire strips thereon to treatment by the stitching rolls 19 or to other operations. For this purpose means are provided for disengaging the gear 66 from the gear 34, thus discontinuing the rotation of the take-up roll 33 without interrupting the rotation of the drum 16.

The sleeve 70 is carried by the shaft 67 and is fixedly connected to sleeve 71 by the integrally cast connectors 72. The sleeve 71 is rotatable on fixed shaft 73 which in turn is supported at its opposite ends respectively by laterally spaced arms 74 projecting upwardly from the base 75. The handle 51 is preferably formed integral with sleeve 71, the latter having one end thereof projecting freely of the sleeve 71, as at 75a, to provide a suitable support to which is secured the arbor 75b upon which are journalled the meshed gears 61 and 62. A downward movement of handle 51 will bring gear 66 into mesh with gear 34 to thereby effect rotation of the drive roll 33, which latter in turn, frictionally engages and causes the take-up roll 28 to rotate to feed the tire strips over the guide table 50 onto the drum. Conversely, upward movement of the handle 51 will cause the sleeve 70 and shaft 67 to swing downward about shaft 73 as a pivot to thereby disengage gear 66 from gear 34 with the result that the take-up roll 28 will cease rotating and strip feeding will be interrupted.

The guide table 50 is pivotally supported in position by a pair of brackets 90 supported by shaft 73. When the frame 25 is rotated to bring into use the spare roll 22, it is sometimes desirable to tilt the table 50 into the dotted line position shown in Figure 4.

In order to facilitate and maintain the gears 66 and 34 in entrainment with minimum manual effort, air pressure is employed for shifting the gear 66 toward the gear 34. For this purpose an air cylinder 80 is supported by bracket 81 mounted on the framework 83. The piston 84 acts on the piston rod 85 to force the latter upwardly against the under face of the sleeve 70 and so shifts said sleeve sufficiently to effect engagement of the gear 66 with the gear 34. Air pressure enters the lower end of the cylinder 80 through a flexible pipe 86, the admission of air being under the operator's control by the manual poppet valve 87 located for convenience on the handle 51 of the operating lever, the compressed air being supplied to the cylinder 80 from a suitable service of supply (not shown) by way of a flexible conduit 86a leading to the valve 87. Preferably, the piston rod 85 is fitted at its free end with a shoe 85a for engagement with the sleeve 70, as is most clearly shown in Figure 5.

In operation when it is desired to feed a strip of tire fabric the operator depresses the handle 51 at the same time depressing the poppet valve 87. The air pressure and the manual depression of the handle cooperate to swing the shaft 67 and sleeve 70 upwardly and the gear 66 into engagement with gear 34. The feeding of the strip proceeds. The operator may hold his hand on the handle 51, perhaps with a finger on the valve 87 to keep it open, while the other hand is free to guide the strip properly onto the surface of the rotating drum 16. When the operator desires to interrupt the feeding, he releases the poppet valve 87 thus cutting off the supply of air pressure from the cylinder and also permitting the air to exhaust therefrom slowly through the poppet valve. The weight of the sleeve 70 and gear 66 will cause the disengagement of the gear 66 from the gear 34 so that the roll 28 immediately ceases feeding, and the slow release of the air pressure from the cylinder forms a yieldable cushion or dashpot for the sleeve 70. If desired the operator may raise the handle 51 as he releases the poppet valve 87 to insure a prompt cessation of feeding.

In operation the take-up roll 28 takes up the carrier web 10, increases in diameter and its stub shafts ride up in the slots 27 in the brackets 26. While the rate of rotation of the take-up roll 28 varies as it grows in diameter by virtue of the surface drive from the friction roll 33 directly to the outer face of the take-up roll, the linear rate of feed of the strips remains constant and is substantially the same as the linear speed of the face of the drum 16.

Thus uneven and irregular feeding of the strips onto the drum is eliminated with little or no possibility for the cord fabric strips either to buckle or become stretched, as would be the case were the strips fed to the drum at a linear speed greater or less than that of the drum.

If desired an extension 91 of the standard 24 is employed in supporting guide-way 92 which feeds the tread rubber to the tire building drum 16 after the several fabrics have been fed thereto and properly treated.

Thus by means of the present apparatus the strip material is fed one strip at a time to the tire drum while the operator is free to apply the strip and see to it that the strip adheres to the drum. The operator readily interrupts the feeding at each strip, attends to the performance of other operations upon the drum or strip and then immediately resumes the feeding of the next strip. After the desired number of strips are properly applied to the drum and properly treated, the tread material is fed to the drum and properly treated thereon by the stitching rolls, the tire being then also subjected to other treatments customary in this art. The drum is then collapsed, the tire removed for subsequent treatment elsewhere, the drum again expanded and it is ready again to receive the first strip of the tire fabric coming off the roll 21 and waiting on the guide 53 for the next tire.

I claim:

1. In combination, a tire building drum, means for rotatably supporting a main roll of tire fabric strips and carrier fabric therefor, a take-up roll adapted to receive said carrier fabric and simultaneously divest said tire fabric strips from said carrier fabric, means for rotatably supporting said take-up roll for said carrier fabric, a friction roll in engagement with the face of said take-up roll, rotary power means independent of and driven in unison with said drum applied to said friction roll whereby to effect rotation of said take-up roll, and means for swinging said rotary power means into and out of operative engagement with said friction roll.

2. In combination, a tire building drum, means for rotatably supporting a main roll of tire fabric strips and carrier fabric therefor, a take-up roll adapted to receive said carrier fabric and simultaneously divest said tire fabric strips from said carrier fabric, means for rotatably supporting said take-up roll for said carrier fabric, a friction roll disposed below said take-up roll, rotary power means applied to said friction roll, said power means being independent of and driven in unison with said drum, and air pressure means for shifting said rotary power means into and out of driving engagement with said friction roll to effect rotation of the latter.

3. A tire strip feeding apparatus comprising means for rotatably supporting a main roll of tire strips and carrier fabric, a take-up roll adapted to receive said carrier fabric and simultaneously divest said tire fabric strips from said carrier fabric, means for rotatably supporting said take-up roll for said carrier fabric, a guide plate disposed in front of said take-up roll, means for transmitting rotary power to said take-up roll thereby feeding said divested strips to said guide plate while the carrier fabric is wound on the take-up roll, said last named means including a rotary friction roll in constant engagement with the cylindrical face of the take-up roll thereby obtaining a uniform rate of feed of said strips, and power transmission means for said friction roll which is shiftable into operative and inoperative positions with respect to said friction roll.

4. A tire strip feeding apparatus including means for rotatably supporting a main roll of tire strips and carrier fabric, a take-up roll adapted to receive said carrier fabric and simultaneously divest said tire fabric strips from said carrier fabric, means for rotatably supporting said take-up roll for said carrier fabric, a guide plate disposed in front of said take-up roll, means for transmitting rotary power to said take-up roll thereby feeding said divested strips to said guide plate while the carrier fabric is wound on the take-up roll, said last named means including a rotary friction roll in engagement with the cylindrical face of the take-up roll, thereby obtaining a uniform rate of feed of said strips, and manually operable means for swinging said power transmitting means into and out of operative engagement with the friction roll.

5. In combination, a tire building drum, means for feeding tire fabric strips successively to said drum including a main roll of carrier web between the convolutions of which are wound said fabric strips and a take-off roll adapted to receive said web as the same is divested of said fabric strips, a motor for said drum and a power take-off from said motor comprising a pair of sprocket wheels and a sprocket chain connecting said sprocket wheels, gear means connecting one of said sprocket wheels to said motor, a stub shaft for the other sprocket wheel, a gear at one end of said stub shaft, means for swingably supporting said stub shaft, and a friction roll interposed between said stub shaft and said take-up roll for effecting rotation of the latter.

6. In combination, a tire building drum, means for feeding tire fabric strips successively to said drum including a main roll of carrier web between the convolutions of which are wound said fabric strips and a take-off roll adapted to receive said web as the same is divested of said fabric strips, a motor for said drum and a power take-off from said motor comprising a pair of sprocket wheels and a sprocket chain connecting said sprocket wheels, gear means connecting one of said sprocket wheels to said motor, a stub shaft for the other sprocket wheel, a gear at one end of said stub shaft, means for swingably supporting said stub shaft comprising air pressure means therefor, and a friction roll interposed between said stub shaft and said take-up roll for effecting rotation of the latter.

7. In combination, a tire building drum, means for feeding tire fabric strips successively to said drum including a main roll of carrier web between the convolutions of which are wound said fabric strips and a take-off roll adapted to receive said web as the same is divested of said fabric strips, a motor for said drum and a power take-off from said motor comprising a pair of sprocket wheels and a sprocket chain connecting said sprocket wheels, gear means connecting one of said sprocket wheels to said motor, a stub shaft for the other sprocket wheel, a gear at one end of said stub shaft, means for swingably supporting said stub shaft comprising a manual control therefor, and a friction roll interposed between said stub shaft and said take-up roll for effecting rotation of the latter.

8. In combination, a tire building drum, means for feeding tire fabric strips successively to said drum including a main roll of carrier web between the convolutions of which are wound said fabric strips and a take-off roll adapted to receive said web as the same is divested of said fabric strips, a motor for said drum and a power take-off from said motor comprising a pair of sprocket wheels and a sprocket chain connecting said sprocket wheels, gear means connecting one of said sprocket wheels to said motor, a stub shaft for the other sprocket wheel, a gear at one end of said stub shaft, a friction roll interposed between said stub shaft and said take-up roll for effecting rotation of the latter, said friction roll having an operating gear, and means for swinging said stub shaft to shift its gear into and out of operative engagement with the gear of said friction roll.

9. A tire strip feeding apparatus comprising means for rotatably supporting a main roll of tire fabric strips and carrier fabric, a take-up roll adapted to receive said carrier fabric and simultaneously divest said tire fabric strips from said carrier fabric, means for rotatably supporting said take-up roll for said carrier fabric, a guide plate disposed in front of said take-up roll, and means for transmitting rotary power to said take-up roll thereby feeding said divested strips to said guide plate while the carrier fabric is wound on the take-up roll, said last named means including a rotary friction roll in constant engagement with the cylindrical face of the take-up roll for obtaining a uniform rate of feed of said strips and a power transmitting element shiftable into and out of operative engagement with said friction roll.

JAMES C. CARLIN.